Patented June 29, 1937

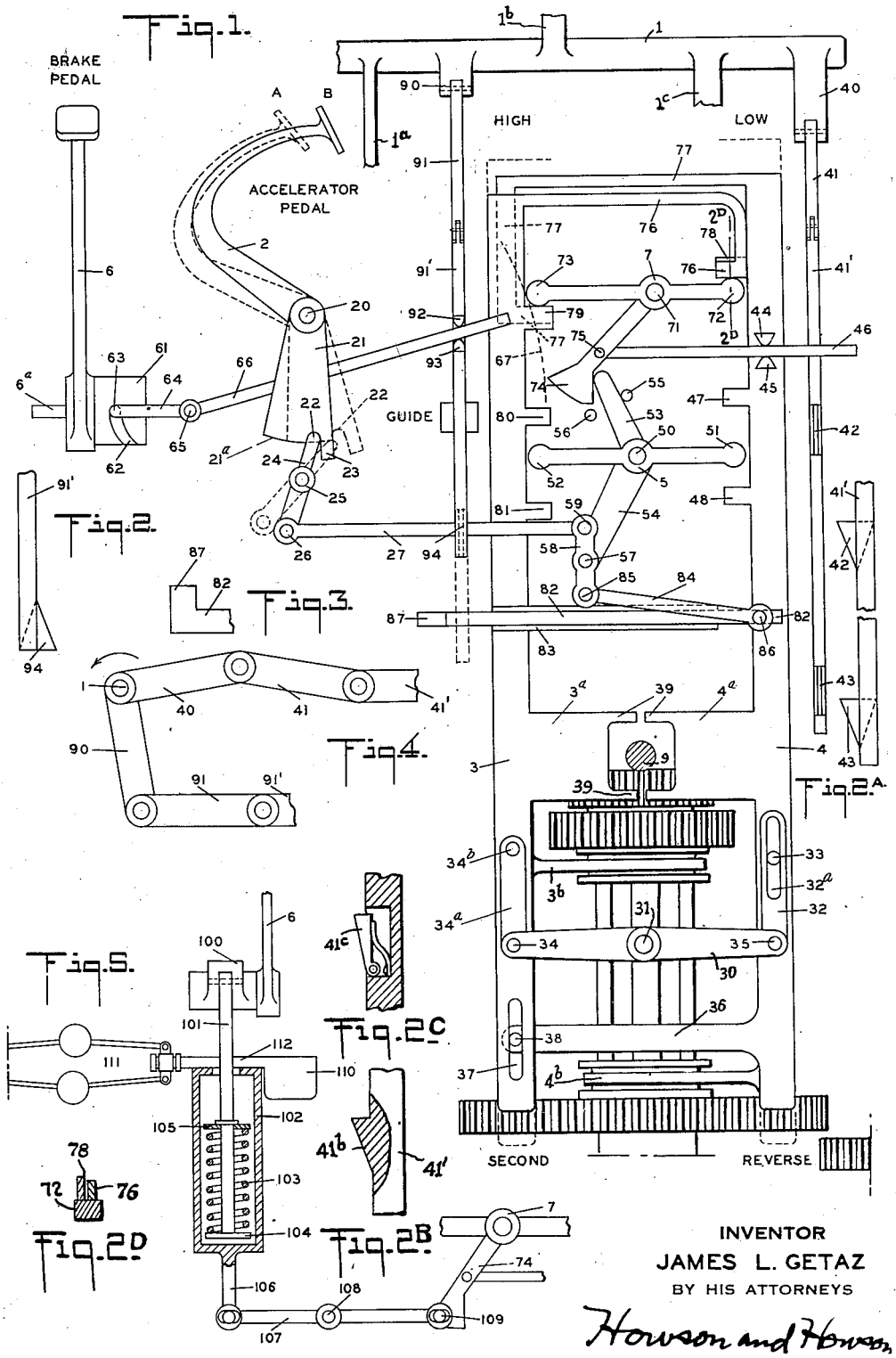

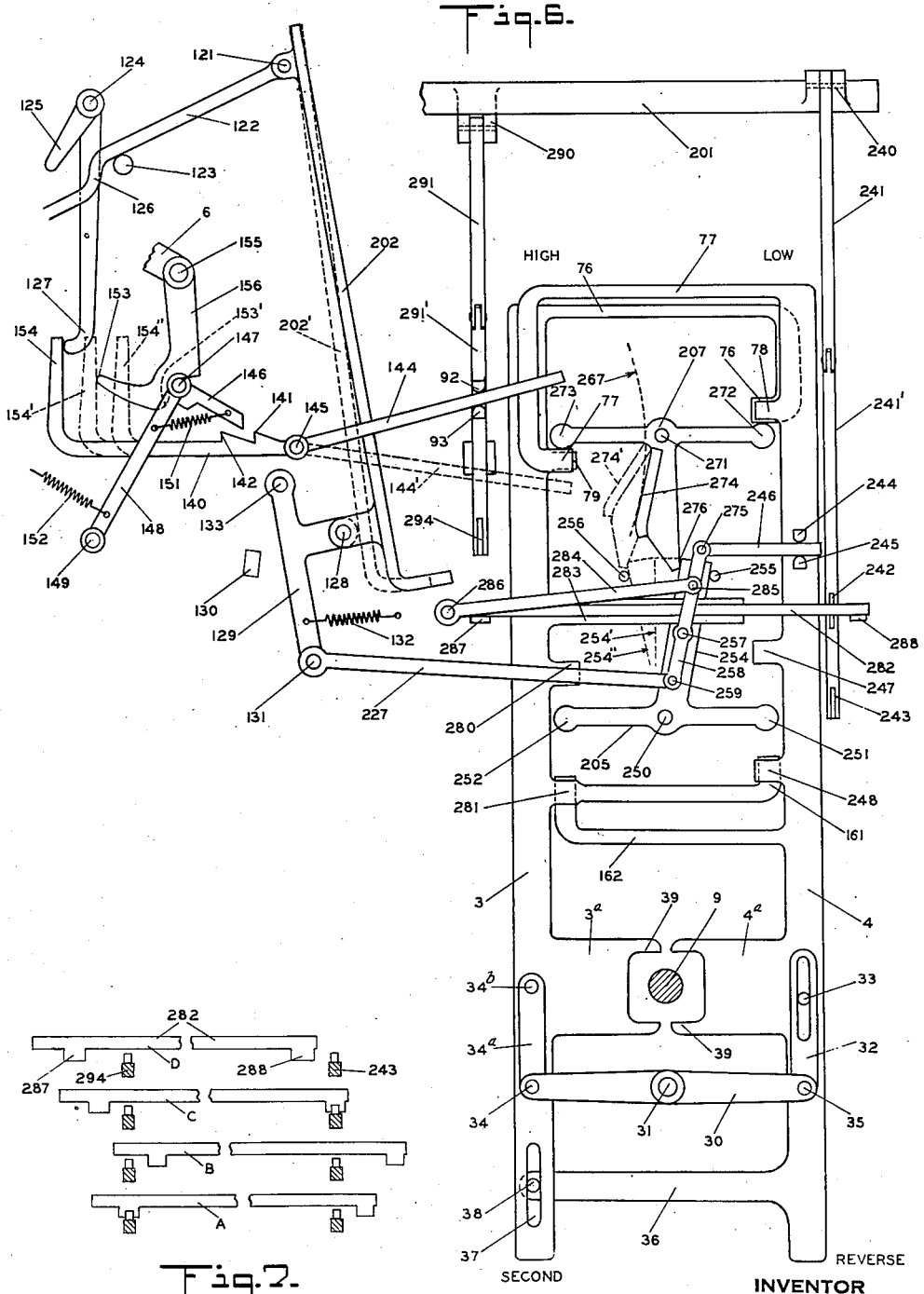

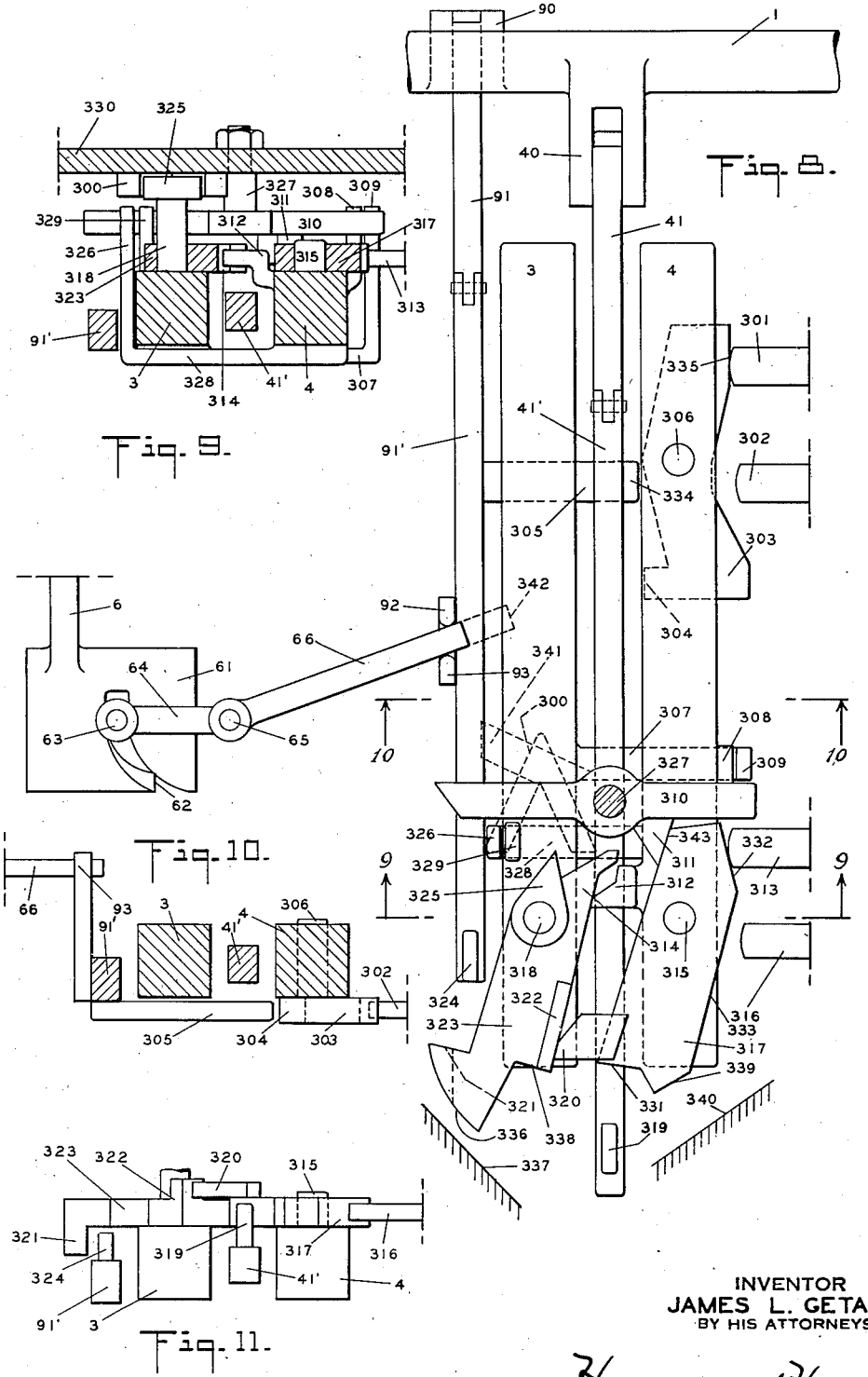

2,085,257

UNITED STATES PATENT OFFICE 2,085,257

AUTOMOBILE GEAR SHIFT TRANSMISSION

James L. Getaz, Maryville, Tenn.

Application June 3, 1933, Serial No. 674,245

80 Claims. (Cl. 192—.01)

This invention relates to automobile transmissions and more particularly to the gear shifting mechanism thereof and it is an object of this invention to provide a gear shift mechanism operated by suitable operating means which may be the clutch controlling or operating means or other means operated synchronously with the clutch operating means or under the conditions under which a clutch operating means would normally operate. It is also an object of this invention to provide a means operated by a suitable manually operated means which may be the accelerator pedal or other speed controlling means whereby a selection is provided of the gear ratios established in the gear set and whereby either the clutch or the speed controlling means may be operated as in the usual control or operation of the vehicle without operating the gear shift mechanism unless desired. It is also an object of this invention to provide a gear shift mechanism of the type described of such construction that the gear shift mechanism may be manually operated at any time regardless of whether or not gears are then engaged. It is also an object of this invention to provide a gear shift mechanism which is operated by a like movement of the operating means irrespective of the position to which the gear set is being shifted or the position from which the gear set is being shifted.

In the drawings—

Figure 1 is a diagrammatic view of the essential parts of a gear shift mechanism constructed in accordance with this invention, the parts being shown with the gear set in the neutral position;

Figs. 2 and 2^A are fragmentary side elevations of rods used to operate the gear set;

Fig. 2^B is a fragmentary view, partly in section, at an abutment on one of the gear operating rods;

Fig. 2^C is a view similar to Fig. 2^B showing an abutment of modified construction; Fig. 2^D is a fragmentary section taken as on line 2^D—2^D in Fig. 1.

Fig. 3 is a fragmentary side elevation of one end of a rod or abutment which cooperates with the rod shown in Fig. 2 in operating the gear set;

Fig. 4 is a fragmentary view showing the angular relation of the cranks fixed on the shaft and connected to the gear set operating rods;

Fig. 5 is a fragmentary view, partly in section of a modification of the means for operating the gear set upon the application of the brake;

Fig. 6 is a view, similar to Fig. 1, of a modified construction embodying this invention;

Fig. 7 is a group of fragmentary sectional views showing several positions of a means which cooperates in the selective operation of the gear set to different gear ratios;

Fig. 8 is a diagrammatic view of the gear shift rails of a gear set and the operating mechanism therefor of a further modification, portions of the casing which cooperate in the operation of the rails being indicated in proper relative positions and the rails being shown in the neutral position of the gear set;

Fig. 9 is a vertical section taken on the line 9—9 of Figure 8, the cover of the casing of the gear set being shown;

Fig. 10 is a vertical section taken on the line 10—10 of Fig. 8, and Fig. 11 is an end elevation of the structure shown in Fig. 8, the cooperating portions of the gear casing being omitted.

In the modification shown in Figs. 1 to 4 inclusive, there is provided a shaft 1, which may be the clutch operating shaft, or some shaft operated synchronously therewith. Where the shaft 1 is a clutch operating shaft the shaft is provided with an arm 1^a which operates the clutch in the usual manner. The shaft 1 may be operated by the usual clutch pedal 1^b or, in the case of an automatically operated clutch, by means of the usual vacuum cylinder (not shown) connected to the arm 1^c. In those cases in which the clutch is not operated the shaft 1 may be a shaft arranged for operation under those conditions under which a clutch shaft is normally operated. There is also provided a pedal 2 which may be the usual accelerator pedal or a lever arranged for convenient operation by the operator of the vehicle, and a pedal 6 which may be the usual brake operating pedal. In the gear set there is provided a rail 3 having an arm 3^b which shifts the gears to the second and high gear positions and a rail 4 parallel to the rail 3 having an arm 4^b which shifts the gear to the low and reverse gear positions. The rails are provided with inwardly projecting arms 3^a and 4^a having spaced fingers 39 at their ends forming abutments for engagement by the usual gear shift lever 9, the fingers 39 on each arm being spaced a distance such that the gear shift lever 9 may engage either rail in any position of the rails permitting manual shifting of the gears at any time. The rails 3 and 4 are connected by mechanism arranged to shift either rail to the neutral position when the other rail is shifted to a gear-engaging position. This mechanism comprises a lever 30 pivoted upon a fixed pin 31 and connected at one end through pin 34 to a link 34^a pivotally connected to the rail 3 by the pin 34^b. At its other end the lever 30 is pivotally connected by pin 35 to a link 32 having a slot 32^a which engages a pin 33 fixed in rail 4. There is also provided an arm 36 fixed upon rail 4 and having at its free end a pin 38 which engages in a slot 37 in the rail 3.

Between the rails 3 and 4 there is provided a hub 5 rotatably mounted on a fixed pin 50 and having radiating arms 51, 52, 53 and 54, the arm 51 being positioned for engagement by projections 47 and 48 on rail 4, arm 52 being positioned for engagement by the projections 80 and 81 on the rail 3, arm 53 being positioned to engage with the fixed stops 55 and 56 which limit the movement of the hub 5 and its arms 51, 52 and 54. The arm 54 has at its free end a pin 57 upon which the lever 58 is rotatably mounted. To one end of the lever 58 a pin 59 secures one end of a link 27, the other end of which is pivotally connected by pin 26 to one end of a lever 24 which rotates on a fixed pin 25. The other end of the lever 24 is positioned to be engaged in a recess 22 in the arm 21 fixed on the shaft 20 of the accelerator pedal 2 or to bear against the end face 21ª of the arm 21. To the other end of the lever 58 a pin 85 secures one end of a link 84, the other end of which is connected by a pin 86 to a rod or abutment 82 which is longitudinally movable in a slot in the arm 83 fixed to the rail 3 and extending transversely thereof.

To the shaft 1 are secured the crank arms 40 and 90 angularly disposed with respect to each other, the crank arm 40 being in a substantially horizontal position when the shaft is in its normal position, that is, in the case of a clutch shaft, with the clutch engaged while the crank arm 90 is in a substantially vertical position at that time, the positions of the crank arms being such that the link 41 operates the rod 41' connected thereto slowly during the first part of the rotation of the shaft 1 from the position shown in Figs. 1 and 4 and more rapidly at the latter part thereof while the link 91 connected to the crank arm 90 operates the rod 91' more rapidly during the first part of the rotation of the shaft 1 from the position shown and more slowly at the latter part thereof.

There is also provided between the rails 3 and 4 a hub 7 rotatably mounted on a fixed pin 71 and having integral therewith the radiating arms 72, 73 and 74, the pin 71 being placed closer to the rail 4 than to the rail 3 so that the arm 72 is of less length than the arm 73. Arm 72 is positioned for engagement by the projection 76 attached to the rail 3 and by the projection 78 attached to the rail 4 while arm 73 is positioned for operation by the projection 79 attached to the rail 3 and by projection 77 attached to the rail 4. As shown in Figure 1, the projections 77 and 78 attached to rail 4 are in back of the projections 76 and 79 attached to the rail 3 and the arms 72 and 73 have sufficient thickness at their ends to be engaged by both projections adjacent their ends as shown in Fig. 2ᴅ. To the arm 74 intermediate its ends a pin 75 connects a rod 46 which extends between the guides 44 and 45 fixed on rail 4 and has its end projecting over the path of the rod 41'. The end of the arm 74 is enlarged and engaged by the end of the arm 53 on hub 5.

The brake pedal 6 is pivotally mounted as at 6ª and is provided with a hub 61 having a spiral groove 62 therein. A rod 64, mounted for longitudinal movement, has a pin 63 at one end thereof engaging in the groove 62 and at its other end is pivotally connected by pin 65 to a rod or plunger 66 which extends between the guides 92 and 93 fixed on rod 91'. In order that the rods 41' and 91' may operate the rails to shift the gears, the rod 41' is provided with the projections or abutments 42 and 43 which, as shown in Figure 2ᴀ, are shaped to engage the rods 46 and 82 respectively as the shaft 1 is rotated to rotate the crank arm 40 in the direction of the arrow shown in Fig. 4 and draw the rod 41' towards the shaft 1. The abutments 42 and 43, it will be noted, may be pivoted and spring pressed outwardly into engaging position, as shown at 41ᶜ in Fig. 2ᶜ, or they may be formed integral with the rod 41', as shown at 41ᵇ in Fig. 2ᴮ, and inclined so as to pass beneath the rods 46 and 82 respectively when the shaft is rotated in the direction opposite to that of the arrow shown in Fig. 4 and the rod 41' is moved away from the shaft 1. Rod 91' is provided with an abutment 94 arranged oppositely to the abutments 42 and 43 and which cooperates with the abutment 87 at one end of rod 82 to operate the rail 3. The abutment 94 may be constructed in the same manner as the abutments 42 and 43.

For the operation of the structure shown in Figures 1 to 4 where the manually operated means 2 is the accelerator pedal or other speed controlling means it is given a range of positions in which the carbureter or speed controlling device is not operated. In the upper limit of this range, as position B in Figure 1, the accelerator pedal is wholly released. In this position the end of the lever 24 is engaged in the notch 22 in the arm 21 on the shaft 20, whereas in the position A shown in dotted lines in Figure 1, the arm 21 has been moved so that the end of the lever 24 has been disengaged from the notch 22 and bears against the curved face 21ª of the arm 21. Further movement of the pedal 2 in the same direction causes no further movement of the lever 24. The movement of the accelerator pedal from position B to position A moves the arm 24 from the notch 22 to its position against the face 21ª and causes operation of the lever 24 from the position shown in solid lines in Fig. 1 to the position shown in dotted lines with a resulting operation of the link 27, lever 58, link 84 and rod 82. The pin 57 upon which the lever 58 pivots is mounted on the end of the arm 54 which is shifted by the movement of the rails 3 and 4. This movement of the arm 54 cooperates with the operation of the lever 24 by the accelerator pedal 2 to control the position of the rod 82 and position it for cooperation with the rods 41' and 91' in the operation of the rails 3 and 4.

To operate the structure shown in Figures 1 to 4 from the neutral position, as shown in Figure 1, to the low gear position, the shaft 1 is operated with the accelerator pedal 2 in position B as shown. With the accelerator pedal in position B as the shaft 1 is rotated in the direction of the arrow in Fig. 4, the projection 42 on rod 41' engages the rod 46 and shifts the rail 4 to the low gear position. As the rail 4 is shifted to the low gear position the projection 77 on rail 4 engages the arm 73, shifting the hub 7 and arm 74 so that as the rail 4 reaches the low gear position the rod 46 is disengaged from the projection 42. Movement of the rail 4 also causes the projection 48 to engage the arm 51, rotating the hub 5 and moving the arm 54 and pin 57 to the right and causing the rod 82 to be moved to the right so as to shift projection 87 across the path of the rod 91', but the arrangement of the cranks 90 and 40 is such that projection 94 on rod 91' has moved past the rod 82 before the projection 87 is moved across the path of the rod 91'. Arm 53 is rotated from engagement with pin 55 to engage with pin 56. The shaft 1 is then operated to engage the clutch either by depressing the accelerator pedal or by operation by the operator and the projection 94 may pass the projection 87 without engaging the same because of the tapered formation of the projection 94. Depressing the accelerator pedal 2 to cause the car to move forward shifts the lever 24 and the rod 82 to a position in which the rod 82 is in the path of the rod 41' but the shape of the projection 43 on the rod 41' is such that the projection 43 will pass the rod without operating the rail 3 if the accelerator is depressed and the rod 82 shifted before the rail 41' returns to the position shown in Fig. 1.

With the car in motion and the gear set in first or low gear position, to change to the second or intermediate gear the accelerator pedal is returned to the position B in which the projection 87 and the rod 82 is in the path of the projection 94 on the rod 41' and the shaft 1 is operated causing the projection 94 to engage the projection 87 and shift the rail 3 to the second or intermediate gear position. With the rail 4 in the low gear position the pin 38 in the arm 36, attached to rail 4, is at the upper end of the slot 37 in rail 3 so that as rail 3 moves to the second gear position the pin 38 is engaged by the rail 3 and the rail 4 is shifted from the low gear to the neutral position. Movement of the rail 4 to the neutral position withdraws the projection 77 from engagement with the arm 73, but as this takes place the projection 76 on the rail 3 is engaged with the arm 72 and holds the hub 7 and arm 74 in the position to which they were shifted by the movement of the rail 4. The movement of the rail 4 also withdraws the projection 48 from the arm 51 but as this takes place the projection 80 on the rail 3 engages the arm 52 and holds the hub 5 and the arm 54 in its adjusted position. Upon movement of the rail 3 to the second gear position the clutch is engaged either by operating the shaft 1 or by depressing the accelerator pedal in order to drive the car. While the accelerator pedal shown when depressed causes the lever 24 to operate the rod 82 to a position in which it will be in the path of the projection 43 on the rod 41', as pointed out previously, the shape of the projection 43 is such that the rod 82 will not be operated thereby as the shaft 1 is rotated to engage the clutch.

With the car in motion and the gear in second gear position, in order to shift the car to high gear position the accelerator pedal is returned to the position A in which position the lever 24 is still operated by the arm 21 so as to position the rod 82 in the path of the projection 43, and the shaft 1 is operated to disengage the clutch. As previously pointed out where an automatically operated clutch is used the position A of the accelerator pedal is such that the clutch will be operated. Upon operation of the shaft 1 the rod 41' is operated causing projection 43 to engage the rod 82 and shift the rail 3 from the second to the high gear position. As rail 3 moves to the high gear position the projection 81 engages the arm 52 and rotates the hub 5 until the arm 53 contacts with the fixed pin 55. The arm 54 is also rotated, shifting the pin 57 and shifting rod 82 so as to disengage the rod 82 from the projection 43 as the rail 3 reaches the high gear position. Shifting of the rail 3 withdraws the projection 76 from the arm 72 but places the projection 79 in contact with the arm 73 so that the hub 7 and arm 74 are still maintained in the adjusted position.

With the gear set in the high gear position operation of the shaft 1, where such shaft is the shaft of an automatically operated clutch, will not cause the operation of the gear set if the accelerator pedal is brought to the position B inasmuch as in that position the projection 87 on rod 82 is clear of the projection 94 on rod 91' and both rods 82 and 46 are held clear of the projections on the rod 41', thus permitting the car to be controlled by manipulation of the accelerator in the usual way.

With the gear set in the high gear position and the car in motion the gear set may be shifted to the second gear position by returning the accelerator pedal to the position A operating the lever 24 to position the rod 82 with the projection 87 in line with the projection 94 on the rod 91' so that upon operation of the shaft 1 the projection 94 engages the projection 87 and shifts the rail 3 to the second gear position. Projection 80 on the rail 3 will engage with the arm 52 shifting the hub 5 and the arm 54 and causing the rod 82 to be moved to the right so that the rod 82 may be engaged by the projection 43 on the rod 41' as when the gear set is moved to second position from first.

With the gear set in the second gear position the speed may be varied by manipulating the accelerator pedal in the usual way, the accelerator pedal being brought to the position B before the shaft 1 is operated. With the accelerator pedal in position B the projection 87 on rod 82 is positioned in line with the projection 94 on the rod 91' while rods 82 and 46 are maintained clear of the abutments on rod 41'. As the rail 3 is in the second gear position the projection 94 is merely moved to contact with the projection 87 but does not shift the gear.

With the gear set in neutral position it is possible to shift the gear set directly to second gear by moving the accelerator pedal 2 to position A before the shaft 1 is operated. Moving the accelerator pedal to the position A operates the lever 24 to shift the rod 82 to the right, positioning the projection 87 in the path of the projection 94 on the rod 91' so that upon operation of the shaft 1 the projection 94 engages the projection 87 and shifts the rail 3 to the second gear position. In this operation the faster early movement of arm 90 and rod 91', and the shorter length of arm 72, cause the operation of the hub 7 and arm 74 to withdraw the rod 46 from the path of the projection 42 on rod 41' before they engage.

With the gear set in the first or low gear position it is possible to shift directly into the high gear position instead of into second position as previously described. With the gear set in first gear position projection 48 on rail 4 has engaged the arm 51 rotating the hub 5 to engage arm 53 with the fixed pin 56 and shifting arm 54 and pin 57 to move the rod 82 to the right. By placing the accelerator pedal in the position A, operating the lever 24 and the lever 58 to shift the rod 82 still further to the right the rod 82 is placed in the path of the projection 43 on the rod 41' so that upon operation of the shaft 1 the projection 43 engages the rod 82 and shifts the rail 3 to the high gear position. When the rail 4 is in the first or low gear position pin 33 on rail 4 is at the upper end of the slot in link 33 so that as rail 3 is moved to the high gear position the link 32 engages the pin 33 and shifts the rail 4 to the neutral position. Projection 81 engages the arm 52 and returns the hub 5 to the position shown in Figure 1 while the projection 77 on the rail 3 engages the arm 73 and holds the hub 7 and arm 74 in the position to which it has been shifted. In this case it will be noted that the positions of the various parts with the rail 3 in high gear position are the same as if the rail 3 had been shifted to high gear position from second gear position.

To shift the gear set to the low gear position from second or high gear position or to shift to the reverse gear position from any of the other positions, the gear shift lever 9 is used the distance between the fingers 39 on the arms 3a and 4a being such that the arms may be engaged irrespective of the positions of the rails. It will also be noted that through the connection of the rails by means of the lever 30 and the arm 36 the shifting of either rail into a gear position by means of the gear shift lever 9 will cause the return of the other rail to the neutral position should it be in any gear position.

Upon each operation of either rail to a gear position, either the arm 72 or the arm 73 is engaged by a projection on the rail and the arm 74 is either moved to or held in a position to the left of that shown in Figure 1. When the car is brought to a stop by the operation of the brake pedal 6 the engagement of the pin 63 in the spiral groove 62 causes the rods 64 and 66 to be moved to the right so that as the shaft 1 is operated the lugs 92 and 93 on the rod 91' move the rod 66 along the dotted line 67 into engagement with the arm 74 and shifts the arm 74 to the position shown in Figure 1. As the arm 74 is returned to this position the arms 72 and 73, through their engagement with the projections on rails 3 and 4, return the rails to the neutral position as shown in Figure 1 while at the same time the rod 46 is moved to the right in position to be engaged by the projection 42 on rod 41' for shifting the gear set to the first gear position and the arm 53 is engaged by the arm 74 and moved to engage the pin 55 thus returning the rod 82 to the position shown in Figure 1.

In some cases it may be desirable to provide for the automatic return of the gears to the neutral position when the speed of the car is reduced to a predetermined rate by the application of the brakes while the clutch is disengaged. To accomplish this there may be provided, as shown in Figure 5, a governor 111 driven from the car and connected to the arm 112 having the projection 110 thereon. The projection 110 is adapted when the car is in motion to be shifted to the left by the operation of the governor 111. With the car in motion the hub 7 and arm 74 of Figure 5, which correspond to the hub 7 and arm 74 of Figure 1, have been rotated clockwise operating the lever 107 to draw down the casing 102 so that the projection 110 may be moved to the left.

On the brake lever 6 there is provided a hub to which is attached the lever 100 having a rod 101 pivotally connected therewith. To the end of the rod 101 is secured a collar 104 while surrounding the rod 101 is a spring 103 having at its other end a collar or washer 105. With the casing drawn down by the shift of either of the rails 3 and 4 to a gear position the collar 105 bears against the upper end of the casing 102 so that upon an application of the brakes the rod 101 tends, through spring 103, to raise the casing 102 but if the speed of the car is sufficient the governor holds the projection 110 in the path of the casing 102 and the spring 103 is merely compressed until the speed of the car is reduced to a point where the governor 111 acts to shift the projection 110 away from the casing 102 whereupon the spring 103 will operate to shift the casing 102, retracting the arm 74 and hub 7 and, through the engagement of arms 72 and 73 with the projections on the rails 3 and 4, returning the rails to the neutral position. Where the brake is released before the speed of the car is reduced to the point at which the projection 110 is removed from engagement with the casing 102, the gears are held in position and are not shifted to the neutral position.

In the modification shown in Fig. 6 the gear shifting rods 3 and 4 have the inwardly extending arms 3a and 4a for cooperation with the usual gear shift lever 9 and are connected by the lever 30 and arm 36, as shown in Fig. 1. The shaft 201, which may be operated as is the shaft 1, is provided with the crank arms 240 and 290 operating the rods 241' and 291' through the links 241 and 291 respectively. Between the rails 3 and 4 is a hub 207 mounted for rotation about a fixed pin 271 and having the arms 272, 273 and 274 formed thereon, the arm 272 being positioned for engagement by the abutment 78 on rail 4 and abutment 76 on rail 3 while the arm 273 is positioned for engagement by the abutment 77 on rail 4 and abutment 79 on rail 3. Also positioned between the rails 3 and 4 is a hub 205 mounted for rotation about the fixed pin 250 and having the arms 251, 252 and 254 formed thereon, the arm 251 being positioned for engagement by the abutments 247 and 248 on the rail 4 and the abutment 161 on the rail 3, while the arm 252 is positioned for engagement by the abutments 280 and 281 on the rail 3 and by the abutment 162 on rail 4. The arm 254 is limited in its movements by the fixed stops 255 and 256 and intermediate its ends is provided with a pin 257 upon which the lever 258 is pivotally mounted. At one end the lever 258 is connected by a pin 275 to a rod 246 which extends between the abutments 244 and 245 fixed upon the rail 4, the end of rod 246 extending in position for engagement by abutment 242 on rod 241'. Intermediate the pins 275 and 257 a pin 285 pivotally connects one end of the link 284 to the lever 258 while the opposite end of link 284 is connected by pin 286 to a rod 282 slidably mounted in a slot in the arm 283 attached to rail 3. At its ends the rod 282 is provided with abutments 287 and 288 which cooperate with abutments 294 and 243 on rods 291' and 241' respectively for the operation of rail 3. To the opposite end of lever 258 pin 259 connects one end of link 227, the other end of which is connected by pin 131 to an end of lever 129, the opposite end of which is pivotally mounted upon the fixed pin 133. Intermediate its ends the lever 129 is connected by pin 128 to the lower end of a manually controlled lever 202, shown as an accelerator pedal, the upper end of which is pivotally connected by pin 121 to a link 122 which connects the accelerator pedal 202 to the usual carbureter or other speed controlling device. Fixed to a shaft 155 upon which the brake pedal 6 is mounted is a crank arm 156 having a toe portion 153 and a recessed portion 153'. Engaging the recess 153' when the brake pedal 6 is in the released position is a pin or stud 147 in an end of the arm 148, the other end of which is pivotally mounted upon a fixed pin 149. Also pivotally mounted on the pin 147 is a pawl 146 having a spring 151 connecting the free end thereof to the lever 148. Mounted for longitudinal movement beneath the pawl 146 is the rod 140 having the ratchet teeth 141 and 142 positioned for engagement by the pawl 146 and, at one end, a bent portion 154 which projects in front of the free end of a lever 127 mounted upon a shaft 124. The bent portion 154 of the rod 140 also projects in front of the toe 153 of the lever 156. Fixed to the shaft 124 is an arm 125 which, in one position, is engaged by the curved portion 126 of the rod 122, the rod 122 being guided by pin 123 in proper relation to the arm 125. To the other end of the rod 140 pin 145 pivotally connects a rod 144 which is guided between abutments 92 and 93 on the rod 291'.

In the operation of the modification shown in Figures 6 and 7, to shift the mechanism from the neutral position shown in Figure 6 to the first gear position the bottom portion of the accelerator pedal 202 is moved to the left against the action of spring 132 until the lever 129 contacts with the fixed stop 130. This movement of the accelerator pedal and lever 129 through link 227, operates the lever 258 to shift the rod 282 and rod 246 to the right. Moving the rod 282 to the right shifts the projection 287 from the path of the projection 294 on the rod 291', while shifting the rod 246 to the right places the rod 246 in the path of the projection 242 on the rod 241' so that upon operation of the shaft 201 projection 242 engages the rod 246 and shifts the rail 4 to the low gear position. Movement of the rail 4 to the low gear position causes projection 77 to engage the arm 273 on the hub 207 and shift the arm 274 to the dotted line position 274'. Movement of the rail 4 also causes projection 248 to engage the arm 251 of the hub 205 rotating the hub about the pin 250 and shifting the arm 254 to the left to the dotted line position 254'. Moving of the arm 254 to the left causes a movement of the pin 257 mounted thereon to the left and moves the lever 258 so that the rod 282 and rod 246 are moved to the left withdrawing the rod 246 from any engagement with the lug 242 as the rail 4 moves into the low gear position. Movement of the rail 4 also shifts the arm 36 and the pin therein so that the pin 38 engages in the upper portion of the slot 37 in rail 3. When the rail 4 completes its movement to low gear position projection 162 engages arm 252 to cooperate with projection 248 in engagement with arm 251 in holding the arm 254 fixed in position 254'. With the rail 4 in the low gear position the clutch is then engaged by operation of the shaft 201. Movement of the arm 254 and the rod 282 shifts the projection 288 into the path of the abutment 243 on rod 241', as shown at C in Figure 7, but the shape of the abutment 243 is such that the rod 282 is not operated as the shaft 201 returns the rod 241' to the position shown in Fig. 6.

With the gear set in the low gear position the gear may be shifted to second gear by placing the lower portion of the accelerator pedal 202 in the dotted line position with the lever 129 against the stop 130, shifting the lever 258 and positioning the rod 282 with the abutment 287 in line with the abutment 294 on the rod 291, as shown at position A in Figure 7. Operation of the shaft 201 then engages the abutment 294 on rod 291' with the abutment 287 and shifts the rail 3 to the second gear position. Movement of the rail 3 to the second gear position causes the rail 3 to engage the pin 38 and through arm 36 to return the rail 4 to the neutral position. Movement of the rail 3 also causes the abutment 280 on rail 3 to engage the arm 252 on the hub 250 and rotate arm 254 to the dotted line position 254'' where it engages the fixed stop 256. Movement of the arm 254 shifts the pin 257 and causes the lever 258 to shift the rod 282 to the left, disengaging the abutment 287 from the abutment 294 as the rail 3 is moved into the second gear position. Movement of the rail 3 also shifts the abutment 76 to engage with the arm 272 so that the arm 274 is held in the dotted line position 274' despite the disengagement of the abutment 77 from the arm 273 as the rail 4 is shifted to neutral position. With the gear in second position the car will be driven by depressing the upper end of the accelerator pedal 202 so as to operate the rod 122 controlling the carbureter and causing the shaft 201 to be operated to engage the clutch and while the lug 288 on rod 282 will be positioned in line with the abutment 243 if the lower portion of the accelerator pedal 202 is held with the lever 129 against the stop 130 the shape of the abutment 243 is such that the rod 282 is not operated as the clutch is engaged.

With the gear in second position the gear set may be shifted into high gear position by pressing the lower portion of the accelerator pedal 202 to the dotted line position with the lever 129 in engagement with the stop 130 so that the lever 258 is operated by link 227 to shift the rod 282 to the right to the position C shown in Figure 7 in which the abutment 288 is in line with the abutment 243 on the rod 241' so that upon operation of the shaft 201 the abutment 243 engages abutment 288 and shifts the rod 282 and the rail 3 to the high gear position. Movement of the rail 3 to the high gear position causes abutment 281 to engage the arm 252 on the hub 205 and shift the arm 254 to the dotted line position 254' in Figure 6. It also shifts the projection 76 from engagement with the arm 272 and engages the projection 79 with the arm 273 so that the arm 274 is held in the dotted line position 274'. In the high gear position projection 161 on rail 3 engages arm 251 and cooperates with abutment 281 in engagement with arm 252 in holding the arm 254 fixed in position 254'.

With the gear in high gear, driving by the use of the accelerator is accomplished in the usual way, the lower portion of the accelerator pedal 202, however, being left in the position shown in solid lines in Figure 6 in which position the rod 282 is, owing to the position of the rail 3, shifted to the position C shown in Figure 7 in which the abutment 288 is in position to be engaged by the abutment 243 on the rod 241'. In this position, operation of the shaft 201 will not affect the gear set inasmuch as the abutment 288 is not engaged by the abutment 243 until the end of the movement of the rod 241'. With the gear set in the high gear position the gear set may be shifted to the second gear position by moving the lower portion of the accelerator pedal 202 to the dotted line position shown in Figure 6 with the lever 129 against the stop 130 and the lever 258 operated so as to shift the rod 282 to the right to the position A shown in Figure 7 in which position the abutment 287 on rod 282 is in line with the abutment 294 on the rod 291' so that upon operation of the shaft 201 the abutment 294 engages the abutment 287 and shifts the rail 3 to the second gear position. In shifting to this position the abutment 280 engages the arm 252 and shifts the arm 254 to the dotted line position 254'' Abutment 76 on rail 3 engages arm 272 so that the arm 274 is still held in the position 274' even though the abutment 79 has been disengaged from the arm 73.

With the gear set in second gear the car may be driven by leaving the lower portion of the accelerator pedal 202 in the solid line position and the rod 282 in the position D shown in Figure 7 in which the projections 288 and 287 are clear of the projections on the rods 241' and 291', respectively, so that even though the shaft 201 is operated by raising the upper portion of the accelerator pedal 202 the gear set is not changed. With the gear set in the neutral position, as shown in Figure 6, it is possible to shift directly to the second gear position, if desired, by causing the operation of the shaft 201 with the lower portion of the accelerator pedal 202 in the solid line position shown in Figure 6. In this position of the accelerator pedal 202 the abutment 287 on the rod 282 is positioned in line with the abutment 294 on the rod 291' and operation of the shaft 201 causes the abutment 294 to engage the abutment 287 and shift the rail 3 to the second gear position. With the gear set in first position it is possible to shift the gear to the high gear position by operating the shaft 201 with the lower portion of the accelerator in the position shown in solid lines in Figure 6 in which position the rod 282 has been shifted by the movement of the rail 4 from the low gear position to the position C shown in Figure 7 and upon operation of the shaft 201 the abutment 243 on rod 241' engages abutment 288 on rod 282 and shifts the rail 3 to the high gear position. In this modification, as in the other modification, the arms 3ª and 4ª are provided with fingers 39 spaced so that the rails may be shifted from any position by means of the manually operated gear shift lever 9 which is used as in the case of the other modification in shifting the gear set to low gear from second or into reverse gear.

In order that the gear set may be returned to the neutral position from any gear position when the car is stopped by the application of the brakes the arm 156, operated from the shaft 155 of the brake lever 6, causes the pawl 146 to engage the ratchet tooth 141 and shift the rods 140 and 144 to the right. The operation of the brake causes the pawl to shift the rod but a single ratchet tooth, but a repeated operation of the brake pedal will cause the pawl 146 to engage with the ratchet tooth 142 and shift the rods 140 and 144 to the right, and upon operation of the shaft 201 releasing the clutch and operating the rod 291' the rod 144 will be moved by the abutments 92 and 93 along the arc 267 into engagement with the arm 274 operating the arms 273 and 272 to the position shown in Figure 1 and returning the rails to the neutral position. The end 276 of the arm 274 will engage with the arm 254 returning the arm 254 and the rods 282 and 246 to the position shown in Figure 6. If the shaft 201 has been operated to disengage the clutch prior to the second operation of the brake pedal 6 the rod 144 will be positioned by the abutments 92 and 93 in line with the arm 274 and upon the second operation of the brake pedal 6 engaging pawl 146 in the ratchet tooth 142 and shifting the rod 144, the rod 144 engages the arm 274 and forces the arm 274 to the solid line position shown in Figure 6. Upon release of the brake the toe or end 153 of the arm 156 engages the upright portion 154 of the rod 140 and shifts the rod 140 with the upright portion in the position 154'. Should, however, the accelerator pedal 202 be operated between applications of the brake the bent portion 126 of the rod 122 engages with the lever 125 rotating shaft 124 and causing lever 127 in engagement with the raised portion 154 of the rod 140 to shift the rod 140 to its normal position. In this way operation of the accelerator pedal between brake applications prevents return of the gear set to neutral position.

In the modification shown in Figures 8 to 11, there is provided an operating shaft 1 having the angularly offset cranks 40 and 90 to which the rods 41' and 91' are connected by the links 41 and 91, respectively. As shown in Figure 8, the rods 41' and 91' extend adjacent the parallel gear set operating rails 3 and 4. Pivotally mounted upon a pin 306, carried by the rail 4, is a pawl or dog 303 having surfaces which contact with abutments 301 and 302 secured to the casing wall and a projection 304 which, in certain positions of the rail 4, is engaged by the end 334 of a projection 305 on the rod 91'. Pivotally mounted upon a pin 315, secured to the rail 4, is a second pawl or dog 317 having surfaces which cooperate with the abutments 313 and 316 secured to the casing wall and a projection 320 which engages an abutment 322 on a pawl 323 secured to a pin 318 pivotally mounted in the rail 3. To the rail 3 is secured a projection 307 which extends beneath the rail 4 and has an upwardly extending end portion 309 adapted to engage one side of a lever 310 pivotally mounted upon a pin 327 secured to the cover 330 of the casing. Secured to the rail 4 is a projection 308 which engages the same side of the lever 310 as does the projection 309. To the rail 3 there is also secured a projection 329 which engages the opposite side of the lever 310 upon the opposite side of the pivot 327. Also engaging the lever 310, adjacent the projection 329, is a projection 326 extending upwardly from the arm 328 secured to the rail 4.

To operate the rails 3 and 4 the rod 41' is provided with a projection 319 adapted to engage the surfaces 331 of pawl 317 and 338 of pawl 323 and rod 91' is provided with a projection 324 adapted to contact with the surface 321 of pawl 323. The projections 319 and 324 are arranged in the same way as are the corresponding projections on the rods 41' and 91' of Fig. 1 and operate the rails 3 and 4 respectively upon the same movements of the rods 41' and 91' as do the rods 41' and 91' of Fig. 1. To the rod 91' there is secured the guiding lugs 92, 93 which guide one end of the rod 66, the other end of which is pivotally connected to one end of a rod 64, the other end of which is provided with a pin 63 engaging in a spiral groove 62 formed in the hub 61 to which the brake lever or pedal 6 is attached. Fixed to the pin 318 so as to move with the pawl 323 is the pawl 325 positioned so as to engage with the angularly disposed abutments 300 carried by the casing cover 330. To the lever 310 there is attached a lug or projection 311 adapted to contact with the surface 343 of the pawl 317.

In the neutral position of the gear set, as shown at Fig. 8, the pawl 317 is positioned with the face 331 thereof in line with the projection 319 on rod 41' so that upon operation of the shaft 1 upon the release of the clutch as the rod 41' moves towards the shaft 1 and the rod 91' moves away from the shaft 1, the projection 319 on the rod 41' engages the surface 331 of the pawl 317 and shifts the pawl 317 and the rail 4 upwardly to the low gear position. As the rail 4 is moved to the low gear position, the abutment 313 by its engagement with surface 332 of the pawl 317, shifts the pawl 317 in a counter-clockwise direction until abutment 316 engages surface 333 of the pawl and gradually withdraws the surface 331 from the projection 319 so that as the rail moves into the low gear position the pawl 317 is withdrawn from its engagement with the projection 319. Movement of the rail 4 into the low gear position causes the projection 312 thereon to contact with the projection 314 of the pawl 323, shifting the pawl 323 in a counter-clockwise direction until abutment 322 on pawl 323 again engages projection 320 on pawl 317 and positioning the surface 321 of the pawl 323 in line with the projection 324 on the rod 91' but, it will be noted, the movement of the pawl 323 takes place subsequently to the movement of the projection 324 past the surface 321 so that the rail 3 is not operated by the rod 91' at this time. Movement of the rail 4 also causes the projection 326 to engage lever 310 and shift it to the dotted line position 341. Movement of the rail 4 also causes the pawl 303 to move from contact with the abutment 301 and to contact with the abutment 302 causing the pawl 303 to be shifted and placing projection 304 thereon in the path of the end 334 of the projection 305 on the rod 91'. Upon reengagement of the clutch the rods 41' and 91' shift the projections 319 and 324, respectively, past the pawls 317 and 323 but the projections are so arranged that the pawls are not operated by this movement of the rods.

With the gear set in the low gear position and the parts positioned as described, to shift the gear set to the second gear position the shaft 1 is again operated, operating the crank arm 90 and shifting the rod 91'. Movement of the rod 91' causes the end 334 of the projection 305 to engage the projection 304 on pawl 303 and shifts the rail 4 from low gear position, abutment 301 engaging and rotating the pawl 303 so that pawl 303 is disengaged from the projection 305 and the rail 4 stopped in the neutral position. Further movement of the rod 91' engages the projection 324 with the surface 321 of the pawl 3, shifting the rail 323 to the second or intermediate gear position. As the rail 3 passes to the intermediate or second gear position the surface 336 of the pawl 323 engages a surface 337 which may be an abutment secured to a casing wall and inclined at such an angle that its contact with the surface 336 of the pawl 323 causes the pawl 323 to be rotated in a counter-clockwise direction, withdrawing the surface 321 of the pawl 323 from in front of the projection 324 upon the rod 91' so that as the rail 3 moves into the intermediate gear position the pawl 323 is disengaged from the projection 324. Movement of the pawl 323 in a counter-clockwise direction causes the projection shifting means, said manually controlled means on the pawl 317, shifting pawl 317 in a counter-clockwise direction and positioning the surface 338 on the pawl 323 in line with the projection 319 on the rod 41'. Movement of the rail 4 to the neutral position withdraws the projection 326 thereon from engagement with the lever 310, but movement of the rail 3 to the intermediate gear position shifts the projection 309 thereon toward the other arm of the lever 310 but the movement is insufficient to engage the projection 309 with the abutment 313.

With the gear set in second gear position and the parts positioned as described above, movement of the gear set to the high gear position is accomplished by again operating the shaft to operate crank 40 and the rod 41' so as to bring the projection 319 on the rod 41' into engagement with the surface 338 on the pawl 323, shifting rail 3 from the second gear position upwardly into the high gear position. As the rail 3 moves upwardly into high gear position, the pawl 325, fixed on pin 318, engages the angular abutments 300 carried by the cover 330 and shifts the pawl 323 in a clockwise direction causing the surface 338 to be withdrawn from engagement with the projection 319 and placing the surface 321 in position to be engaged by the projection 324 but at this time the projection 324 is past the surface 321 so that the pawl 323 is not engaged by the projection 324 at this time. Movement of the rail 3 to the high gear position withdraws the projection 309 from the lever 310 but at the same time it shifts the projection 329 towards the lever 310.

With the gear set in the high gear position and the parts positioned as described, the gear set may be shifted to the second or intermediate gear position by operating the shaft 1 to operate crank 90 and the rod 91' and engage the projection 324 thereon with the surface 321 of the pawl 323 and shift the rail 3 to the intermediate gear position, the parts taking the same positions as when moved to second gear position from first gear position so that the gear set may be changed to the high gear position in the usual way. It is thus apparent that the gear set may be operated progressively from the low gear to the high gear position and then alternated between the second or intermediate gear position and the high gear position by like movements of the operating means.

The gear set may be shifted to the reverse gear position by manual operation of the usual gear shift lever (not shown) shifting the rail 4 downwardly. Movement of the rail 4 to the low gear position will cause the projection 308 to engage the lever 310 and shift the lever 310 to an angular position, as to the dotted line position 341 in Fig. 8, in the same manner as shifting the gear set to any of the other gear positions. Movement of the rail 4 will also cause the surface 339 of the pawl 317 to engage the abutment 340 but does not shift the pawl 317 unless the rail 4 is moved to the reverse position from a position other than neutral position in which event the abutment 340 returns the pawl 317 to the position shown in Fig. 8.

When the brake is applied, rotation of the hub 61 by the brake pedal 6 causes the spiral groove 62 and the pin 63 to shift the rods 64 and 66 to the right, the end of the rod 66 assuming the dotted line position 342, as shown in Figure 8. With the gear set in any gear position it will be noted that the lever 310 is in an angular position as the dotted line position 341 and that with the brake applied the rod 66 which extends to the dotted line position 342 overlaps the position 341 of the lever 310. If the shaft 1 is operated when the gear set is in a gear position and the brake is applied, the movement of the rod 66 by the guide lugs 92, 93 causes the rod 66 to engage the lever 310 rotating the lever 310 and through the engagement of the lever 310 with the projections 308, 309, 326 and 329 return to the neutral position whichever rail is a gear position as the rod 66 returns the lever 310 to the position shown in Figure 8. As the lever 310 returns to the position shown in Figure 8 the projection 311 thereon engages the surface 343 of the pawl 317, rotating the pawl 317 in a clockwise direction to the position shown in Figure 8 and causing the projection 320 on the pawl 317 to engage with the projection 322 on the pawl 323 so as to ensure the pawl 323 being in the correct position for the neutral position of the gear set.

What is claimed is:—

1. In an automobile, a gear set, means for controlling the speed of the vehicle, means for shifting said gear set from one gear ratio to another and means operated by said speed controlling means for selecting the gear ratio to which said gear set is shifted.

2. In an automobile, a gear set, means for controlling the speed of the vehicle, means for shifting said gear set to different gear ratios and means operated by said speed controlling means for establishing an operative connection between said gear set and said means for shifting said gears.

3. In an automobile, a gear set having low, intermediate and high gear ratios, means for controlling the speed of the vehicle, means for shifting said gear set to the different gear ratios and means operated by said speed controlling means for selecting between said low and intermediate gear ratios when said gear set is in neutral position.

4. In an automobile, a gear set having low, intermediate and high gear ratios, means for controlling the speed of the vehicle, means for shifting said gear set to the different gear ratios and means operated by said speed controlling means for selecting between said intermediate and high gear ratios when said gear set is in the low gear ratio.

5. In an automobile, a gear set having low, intermediate and high gear ratios, speed controlling means, means for shifting said gear set to the different gear ratios comprising a variable connection between the gear set and its shifting means and means operated by said speed controlling means for establishing the connection between said gear set and its shifting means to shift said gear set to intermediate gear ratio when said gear set is in high gear ratio.

6. In an automobile, a gear set, speed controlling means, means for shifting said gear set from one gear ratio to another and means operated by said speed controlling means for selecting the gear ratio, said speed controlling means being operable to prevent operation of the gear set while controlling the speed of the automobile.

7. In an automobile, a gear set, clutch controlling means, means for controlling the speed of the vehicle, means operated by said clutch controlling means for shifting said gear set from one gear ratio to another and means operated by said speed controlling means for selecting the gear ratio to which said gear set is shifted.

8. In an automobile, a gear set, clutch controlling means, a throttle valve operating means operated by said clutch controlling means for shifting said gear set from one gear ratio to another, means operated by said throttle valve operating means for selecting the gear ratio, braking means, and means operated by said braking means for shifting said gear set.

9. In an automobile, a gear set, clutch controlling means, manually controlled means, rails for shifting said gear set from one gear ratio to another, rods operated by said clutch controlling means and plungers engaging said rails and positioned by said manually controlled means for engagement by said rods to operate said rails.

10. In an automobile, a gear set, clutch controlling means, throttle valve operating means, rails for shifting said gear set from one gear ratio to another, rods operated by said clutch controlling means, plungers engaged by said rails and positioned by said throttle valve operating means for engagement by said rods to operate said rails, a lever operated by said rails, braking means and means operated by said braking means for rotating said lever and operating said rails and gear set.

11. In an automobile, a gear set, clutch controlling means, throttle valve operating means, means operated by said clutch controlling means for shifting said gear set from one gear ratio to another, means operated by said throttle valve operating means for selecting the gear ratio, braking means, and means controlled by said braking means and throttle valve operating means for shifting said gear set.

12. In an automobile, a gear set, clutch controlling means, throttle valve operating means, means operated by said clutch controlling means for shifting said gear set from one gear ratio to another, means operated by said throttle valve operating means for selecting the gear ratio, braking means and means controlled by said braking means and clutch controlling means for shifting said gear set.

13. In an automobile, a gear set, clutch controlling means, throttle valve operating means, means operated by said clutch controlling means for shifting said gear set from one gear ratio to another, means operated by said throttle valve operating means for selecting the gear ratio, braking means and means controlled by said braking means, throttle valve operating means and clutch controlling means for shifting said gear set.

14. In an automobile, a gear set, clutch controlling means, speed controlling means, rails for shifting said gear set from one gear ratio to another, rods operated by said clutch controlling means and means engaging said rails and positioned by said speed controlling means and the operation of said rails for engagement by said rods to operate said rails.

15. In an automobile, a gear set, clutch controlling means, speed controlling means, a rail for shifting said gear set to a plurality of gear ratios, rods operated by said clutch controlling means, means selectively positioned by said speed controlling means for engagement by one of said rods to operate said rail to shift said gear set to a selected gear ratio.

16. In an automobile, a gear set, clutch controlling means, speed controlling means, a rail for shifting said gear set to a plurality of gear ratios, rods operated by said clutch controlling means, means engaging said rail and means operated by said rail and said speed controlling means for positioning said rail engaging means for engagement by one of said rods to shift said gear set to a selected gear ratio.

17. In an automobile, a gear set, clutch controlling means, throttle valve operating means, braking means, means operated by said clutch controlling means for shifting said gear set to different gear ratios, means operated by said throttle valve operating means for selecting the gear ratio, means operated by said gear set upon movement of said gear set to an operative position, and means operated by said braking means for operating said gear set operated means to shift said gear set.

18. In an automobile, a gear set, clutch controlling means, throttle valve operating means, means operated by said clutch and throttle valve operating means to shift said gear set to different gear ratios, braking means, means operated by a repeated operation of said braking means to shift said gear set and means operated by said throttle valve operating means preventing shifting of said gear set by said braking means upon operation of said throttle valve operating means between operations of said braking means.

19. In an automobile, a gear set, clutch controlling means, manually controlled means, means operated by said clutch and manually controlled means to shift said gear set to different gear ratios, braking means, a plunger operated by a repeated operation of said braking means to effect the shifting of said gear set and means operated by said manually controlled means to shift said plunger to an inoperative position.

20. In an automobile, a gear set, clutch controlling means, manually controlled means, means operated by said clutch and manually controlled means to shift said gear set to different gear ratios, braking means, a plunger operated by a repeated operation of said braking means to effect the shifting of said gear set and means operated by said manually controlled means and operating said plunger to prevent shifting of said gear set.

21. In an automobile, a gear set, means for operating said gear set, a lever adapted to pivot about a plurality of points, means to control the vehicle speed by the pivotal movement of said lever about one pivot point and means operated by the pivotal movement of said lever about the other pivot point to cooperate with said gear set operating means in selectively shifting said gear set to different gear ratios.

22. In an automobile, a gear set, means for operating said gear set, a lever adapted to pivot about a plurality of points, means to control the vehicle speed by the pivotal movement of said lever about one pivot point and means operated by the pivotal movement of said lever about the other pivot point and by the shifting of the gear set to cooperate with said gear set operating means in shifting said gear set to different gear ratios.

23. In an automobile, a gear set, means for operating said gear set, an accelerator pedal, a lever pivotally supporting said pedal, speed controlling means operated by pivotal movement of said pedal about the connection of said pedal and lever and means connected to said lever and operated by a movement of said lever by said pedal to cooperate with said gear set operating means in shifting said gear set to different gear ratios.

24. In an automobile, a gear set, means for operating said gear set, manually controlled means and means operated by said manually controlled means to cooperate with said gear set operating means in shifting said gear set to different gear ratios, said manually controlled means having a position in which the means operated thereby cooperates with the gear set operating means in effecting successive changes of the gear ratios and the means operated by said manually controlled means having its position varied by the operation of the gear set.

25. In an automobile, a gear set, means for operating said gear set, manually controlled means and means operated by said manually controlled means to cooperate with said gear set operating means in shifting said gear set to different gear ratios, the said means operated by said manually controlled means having its position varied by the operation of the gear set.

26. In an automobile, a gear set, means for operating said gear set, an accelerator pedal controlling the vehicle speed, abutments operated by said accelerator pedal to cooperate with said gear set operating means in shifting said gear set to different gear ratios, and means to operate said abutments by said gear set while said accelerator pedal is operated to one position to cooperate with said gear set operating means in progressively shifting said gear set from low to high gear position.

27. In an automobile, a gear set, means for operating said gear set, an accelerator pedal controlling the vehicle speed, abutments operated by said accelerator pedal to cooperate with said gear set operating means in shifting said gear set to different gear ratios, and means to operate said abutments by said gear set while said accelerator pedal is operated to one position to cooperate with said gear set operating means in progressively shifting said gear set from low to high gear position and then to return said gear set to intermediate position.

28. In an automobile, a gear set, clutch controlling means, speed controlling means, means operated by said clutch controlling means for shifting said gear set, means operated by said speed controlling means cooperating with gear set operating means in shifting said gear set from one gear ratio to another and manually operated means operable to shift said gear set irrespective of the position thereof.

29. In an automobile, a gear set, clutch controlling means, speed controlling means, rods operated by said clutch controlling means, rails for shifting said gear set to a plurality of gear ratios, means positioned by said speed controlling means operatively connecting said rods and rails for operation of said gear set, a manually operated gear shift lever and a lost-motion connection between said lever and each of said rails whereby said lever may engage either of said rails irrespective of the positions of said rails.

30. In an automobile, a gear set, means for shifting said gear set from one gear ratio to another and manually controlled means for selecting the gear ratio to which said gear set is shifted, said manually controlled means being positioned for effecting a different operation of said gear set upon each operation of said gear set from one gear ratio to another.

31. In an automobile, a gear set, means for shifting said gear set from one gear ratio to another and manually controlled means connecting said gear set and said shifting means for selective operation of said gear set by said shifting means said manually controlled means being positioned for effecting a different operation of said gear set upon each operation of said gear set from one gear ratio to another.

32. In an automobile, a gear set, means for shifting said gear set from one gear ratio to another and manually controlled means effecting a selective connection of said gear set and shifting means, said manually controlled means being positioned by said gear set for effecting a different operation of said gear set upon each operation of said gear set from one gear ratio to another.

33. In an automobile, a gear set having operating rails therefor, a clutch controlling means and means operatively connecting said clutch controlling means and rails, said means being positioned for effecting a different operation of said gear set upon each operation of said gear set from one gear ratio to another.

34. In an automobile, a gear set having operating rails therefor, operating means for said rails, means operatively connecting said rail operating means and rails comprising means operated upon the operation of said gear set to one gear ratio for effecting operative connection between said rail operating means and rails to shift said gear set to a different gear ratio and speed controlling means having an operative connection to said connecting means.

35. In an automobile, a gear set having operating rails therefor to which the gear shifting yokes are continuously connected, operating means for said rails, means operatively connecting said rail operating means and rails comprising means carried by said rails and operative to effect connection of said rails and operating means for progressively operating said gear set upon repeated operations of said rail operating means and means controlling the speed of the vehicle having an operative connection to said connecting means.

36. In an automobile, a gear set having operating rails therefor, operating means for said rails, means operatively connecting said operating means and rails comprising means effecting operative connection of said operating means and rails to operate said gear set to progressively increasing gear ratios upon repeated operation of said operating means and means controlling the speed of the vehicle having an operative connection to said connecting means.

37. In an automobile, a gear set, clutch operating means, means connecting said gear set and clutch operating means to operate said gear set to different gear ratios upon repeated operation of said clutch operating means and means controlling the speed of the vehicle having an operative connection to said connecting means.

38. In an automobile, a gear set, clutch operating means, means connecting said gear set and clutch operating means to operate said gear set to progressively increasing gear ratios upon repeated operation of said clutch operating means and means controlling the speed of the vehicle having an operative connection to said connecting means.

39. In an automobile, a gear set having low, intermediate and high gear ratios, clutch operating means, means connecting said gear set and clutch operating means to progressively operate said gear set from the low gear ratio to the high gear ratio and back to the intermediate gear ratio upon repeated operation of said clutch operating means and means controlling the speed of the vehicle having an operative connection to said connecting means.

40. In an automobile, a gear set having low, intermediate and high gear ratios, clutch operating means, means connecting said gear set and clutch operating means to shift said gear set to the intermediate and high gear ratios alternately upon repeated operation of said clutch operating means and means controlling the speed of the vehicle having an operative connection to said connecting means.

41. In an automobile, a gear set having low, intermediate and high gear ratios, clutch operating means, means connecting said gear set and clutch operating means to progressively operate said gear set from the low to the high gear ratio and then alternately to intermediate and high gear ratios upon repeated operation of the clutch operating means and means controlling the speed of the vehicle having an operative connection to said connecting means.

42. In an automobile, a gear set, clutch operating means, means to operate said gear set from said clutch operating means, said means being operated by movement of said gear set to one position to effect connection for operation of said gear set to another position, and speed controlling means having an operative connection to said connecting means.

43. In an automobile, a gear set having operating rails therefor, an operating shaft, rods operated by said shaft, pawls establishing connections between said rods and rails and means operating said pawls upon one movement of said rails to effect the connection for a different movement of said rails.

44. In an automobile, a gear set having operating rails therefor, an operating shaft, rods operated by said shaft, pawls establishing connections between said rods and rails and means operating said pawls upon the completion of one movement of said rails to effect the connection for the next movement of said rails in a progressive operation of said gear set.

45. In an automobile, a gear set having operating rails therefor, an operating shaft, rods operated by said shaft, pawls establishing connections between said rods and rails and means operating said pawls upon the completion of one movement of said rails to effect the connection for the next movement of said rails in the operation of said gear set to two gear ratios alternately.

46. In an automobile, a gear set having operating rails therefor, an operating shaft, rods operated by said shaft, means to selectively connect one of said rods and one of said rails to operate said gear set and speed controlling means having an operative connection to said connecting means.

47. In an automobile, a gear set having operating rails therefor, rods for operating said rails, operating means for said rods, means for connecting rods individually to particular rails to shift said gear set to different gear ratios and means controlling the speed of the vehicle having an operative connection to said connecting means.

48. In an automobile, a gear set having operating rails therefor, rods for operating said rails, operating means for said rods, means for establishing connections between said rods and rails individually to shift said gear set to different gear ratios, said operating means having the same movement irrespective of the gear ratio to which the gear set is shifted and means controlling the speed of the vehicle having an operative connection to said connecting means.

49. In an automobile, a gear set, rails for operating said gear set, means for operating said rails, and a plunger carried by the rail which shifts the gears into low gear and means for operating said plunger so that said plunger engages said rail operating means when said rail is in neutral position and becomes disengaged when said rail reaches position for low gear.

50. In an automobile, a gear set, rails for operating said gear set, means for operating said rails and means carried by the rail which shifts the gears into low gear and means for operating said rail carried means so that said rail carried means engages said rail operating means when said rail is in position for low gear and becomes disengaged when said rail reaches the position of neutral gear.

51. In an automobile, a gear set, rails for operating said gear set, means for operating said rails, means carried by the rail which shifts the gears into intermediate gear, and means for operating said rail carried means so that said rail carried means engages said rail operating means as the rail which shifts the gears into the low gear moves into low gear position.

52. In an automobile, a gear set, rails for operating said gear set, means for operating said rails in both directions, means carried by the rail which shifts the gears into intermediate gear and high gear, and means for operating said rail carried means so that when said rail is shifted into position for intermediate gear said means operates said rail carried means to engage said rail with said rail operating means for operating said rail to high gear position.

53. In an automobile, a gear set, rails for operating said gear set, means for operating said rails in both directions, means carried by the rail which shifts the gears into intermediate and high gears and means for operating said rail carried means so that when said rail is shifted into position for high gear said means operates said rail carried means to engage said rail with said rail operating means for operating said rail to intermediate gear position.

54. In an automobile, a gear set, a rail to which a gear shifting yoke is continuously connected for operating gears of said gear set, means for operating said rail in different directions so as to engage different gear ratios, means carried by said rail and means for operating said rail carried means so that when said rail is moved into position for one gear ratio said means operates said rail carried means so as to engage said rail with said rail operating means to operate said rail to another gear ratio position.

55. In an automobile, a gear set, a rail to which a gear shifting yoke is continuously connected for operating gears of said gear set, means for operating said rail, means carried by said rail and means for operating said rail carried means so that when said rail is moved into one gear position said means operates said rail carried means to engage said rail with said rail operating means to move said rail out of said gear position.

56. In an automobile, a gear set, clutch controlling means, braking means, means positioned by said braking means for operation by said clutch controlling means for shifting said gear set.

57. In an automobile, a gear set, operating means for said gear set, braking means, means positioned by said braking means for operation by said gear set operating means for shifting said gear set.

58. In an automobile, a gear set, means for operating said gear set, a manually operated lever which moves said gear set into different gear ratios upon repeated operation of the same movement of said manually operated lever, a second manually operated lever, which being operated in cooperation with the first manually operated lever, shifts the gear set into neutral position.

59. In an automobile, a gear set, rails for operating said gear set and a lever operated by said rails and having two positions, one position for one position of the gear set and another position for all other positions of said gear set, said lever being moved from its first position by the operation of said gear set and returning said gear set to its original position from any position to which it may have been moved upon its return to its first position.

60. In an automobile, a gear set, a rail for shifting said gear set, means for operating said rail and a lever operated by movement of said rail, said lever having two positions, one position for neutral position of said rail and another position for any gear engagement position of said rail, and said lever being moved from its first position by movement of said rail and returning said rail to neutral position from any gear engagement position to which it may have been moved upon its return to its first position.

61. In an automobile, a gear set, rails for operating said gear set, means for operating said rails, means carried by said rails for effecting operative connection between said rails and the means for operating said rails, a lever for shifting any rail from a gear engagement position to its neutral position, means on said lever for shifting said means carried by said rails to its position for starting the car when said rails are returned by said lever to their neutral position.

62. In an automobile, a gear set, means for operating said set back and forth between high and intermediate gears upon repeated operation of a manually controlled lever, means carried by the rail for shifting gears from intermediate to high gear to effect operative connection between said rail and said gear set operating means, and means operated by a second manually controlled lever for disengaging said rail carried means from effecting operative connection between said rail and gear set operating means.

63. In an automobile, a gear set, clutch controlling means, manually controlled means, rails for shifting said gear set from one gear ratio to another, and means for connecting said rails to said clutch controlling means for operation thereby, said connecting means being positioned by said manually controlled means for engagement by said clutch controlling means.

64. In an automobile, a gear set, clutch controlling means, manually controlled means, rails for shifting said gear set from one gear ratio to another, operating means for said rails, means positioned by said manually controlled means for engagement by said rail operating means to operate said rails, braking means and means operated by said braking means for operating said rails and gear set.

65. In an automobile, a gear set, clutch controlling means, means for controlling the speed of the vehicle, rails for shifting said gear set from one gear ratio to another, operating means for said rails connected to said clutch controlling means, and means engaging said rails and positioned by said means for controlling speed and the operation of said rails for engagement by said operating means to operate said rails.

66. In an automobile, a gear set, clutch controlling means, means for controlling speed, a rail for shifting said gear set to a plurality of gear ratios, operating means for said rails connected to said clutch controlling means and means selectively positioned by said means for controlling speed for engagement by said operating means to operate said rail to shift said gear set to a selected gear ratio.

67. In an automobile, a gear set, clutch controlling means, means for controlling speed, a rail for shifting said gear set to a plurality of gear ratios, operating means for said rail, means engaging said rail and means operated by said rail and said means for controlling speed for positioning said rail engaging means for engagement by said operating means to shift said gear set to a selected gear ratio.

68. In an automobile, a gear set, clutch controlling means, manually controlled means, means operated by said clutch and manually controlled means to shift said gear set to different gear ratios, braking means, means operated by operation of said braking means to effect the shifting of said gear set, and means operated by said manually controlled means to shift said means operated by braking means to an inoperative position.

69. In an automobile, a gear set, clutch controlling means, manually controlled means, means operated by said clutch controlling means and manually controlled means to shift said gear set to different gear ratios, braking means, means operated by operation of said braking means to effect the shifting of said gear set, and means operated by said manually controlled means to operate said means operated by operation of said braking means to prevent the shifting of said gear set.

70. In an automobile, a gear set having gear operating rails, clutch controlling means, a manually operated gear shift means and a lost-motion connection between said manually operated means and each of said rails whereby said manually operated means may engage either of said rails irrespective of the position of said rails.

71. In an automobile, a gear set having operating rails therefor to which the gear operating yokes are continuously connected, operating means for said rails, manually operated means for putting said operating means into operation, and means operatively connecting said rail operating means and rails comprising means carried by said rails, said rail carried means operating upon movement of said rails to one position to effect connection of said rail operating means and said rails for movement of said rails to another position upon the next movement of said manually operated means.

72. In an automobile, a gear set having a plurality of operating rails therefor to which the gear operating yokes are continuously connected, an operating shaft, means operated by said shaft for shifting said rails, means carried by said rails for establishing connections between said shaft operated means and said rails and means operating said rail carried means upon one movement of said rails to effect said connections for a different movement of said rails.

73. In an automobile, a gear set having a plurality of operating rails therefor to which the gear operating yokes are continuously connected, an operating shaft, means operated by said shaft for shifting said rails, means carried by said rails for connecting said operating means and said rails, and means operating said connecting means upon the completion of one movement of said rails to effect the connection for the next movement of said rails in a progressive operation of said gear set.

74. In an automobile, a gear set having a plurality of operating rails therefor to which the gear operating yokes are continuously connected, an operating shaft, means operated by said shaft for shifting said rails, means carried by each of said rails for connecting said operating means and said rails, and means operating the connecting means carried by one of said rails upon the completion of one movement of said rail to effect said connection for the next movement of said rail in the operation of said gear set to two gear ratios alternately.

75. In an automobile, a gear set having operating rails therefor, an operating shaft, means operated by said shaft for operating each of said rails, means to selectively connect one of said operating means and one of said rails to operate said gear set, and means for controlling speed having an operative connection to said connecting means.

76. In an automobile, a gear set having operating rails therefor, operating means for each of said rails, means for connecting said operating means individually to particular rails to shift said gear set to different gear ratios, and means for controlling the speed of the vehicle having an operative connection to said connecting means.

77. In an automobile, a gear set having operating rails therefor, means for operating each of said rails, means for establishing connections between said operating means and said rails individually to shift said gear set to different gear ratios, said operating means having the same movement irrespective of the gear ratio to which the gear set is shifted and means for controlling the speed of the vehicle having connection to said connecting means.

78. In an automobile, a gear set, rails for operating said gear set, means for operating said rails, and means carried by the rail which shifts the gears into low gear and means for operating said rail carried means so that said rail carried means engages said rail operating means when said rail is in neutral position and becomes disengaged when said rail reaches position for low gear.

79. In an automobile, a gear set having operating rails therefor to which the gear shifting yokes are continuously connected, operating means for said rails, manually operated means for putting said operating means into operation, and means operatively connecting said rail operating means and rail comprising means carried by said rails and operated upon movement of said rails to establish one gear ratio to effect operative connection between said rails and rail operating means to establish a different gear ratio, upon the next movement of said manually operated means.

80. In an automobile, a gear set having operating rails therefor, to which the gear shifting yokes are continuously connected, operating means for said rails, manually operated means for putting said operating means into operation, and means operatively connecting said rail operating means and rail comprising means carried by said rails and rods connected to said operating means, said rail carried means operating upon movement of said rails to one position to effect connection of said rods and rails for movement of said rails to another position upon the next movement of said manually operated means.

JAMES L. GETAZ.

CERTIFICATE OF CORRECTION.

Patent No. 2,085,257. June 29, 1937.

JAMES L. GETAZ.

It is hereby certified that error appears in the printed specification of the above numbered patent requiring correction as follows: Page 2, first column, line 13, for "is" read its; page 7, first column, line 48, for "pawl 3" read pawl 323; line 49, for "rail 323" read rail 3; line 63, for "shifting means, said manually controlled means" read 322 on the pawl 323 to engage the projection 320; and that the said Letters Patent should be read with these corrections therein that the same may conform to the record of the case in the Patent Office.

Signed and sealed this 31st day of August, A. D. 1937.

Leslie Frazer (Seal) Acting Commissioner of Patents.